US010762831B2

(12) United States Patent
Winston et al.

(10) Patent No.: US 10,762,831 B2
(45) Date of Patent: Sep. 1, 2020

(54) FLEXIBLE ELECTROLUMINESCENT DISPLAY FOR USE WITH ELECTRONIC GAMING SYSTEMS

(71) Applicant: Aristocrat Technologies Australia Pty Limited, North Ryde, NSW (AU)

(72) Inventors: Eric P. Winston, Reno, NV (US); Cash John Imutan, Henderson, NV (US); Lingjiang Cheng, Las Vegas, NV (US)

(73) Assignee: ARISTOCRAT TECHNOLOGIES AUSTRALIA PTY LIMITED, North Ryde, NSW (AU)

( * ) Notice: Subject to any disclaimer, the term of this patent is extended or adjusted under 35 U.S.C. 154(b) by 44 days.

(21) Appl. No.: 15/681,818

(22) Filed: Aug. 21, 2017

(65) Prior Publication Data

US 2019/0057641 A1 Feb. 21, 2019

(51) Int. Cl.
| | |
|---|---|
| *A63F 9/00* | (2006.01) |
| *G09G 3/30* | (2006.01) |
| *A63F 13/90* | (2014.01) |
| *A63F 13/25* | (2014.01) |
| *G07F 17/32* | (2006.01) |
| *A63F 13/2145* | (2014.01) |
| *G09G 5/00* | (2006.01) |

(52) U.S. Cl.
CPC ............ *G09G 3/30* (2013.01); *A63F 13/2145* (2014.09); *A63F 13/25* (2014.09); *A63F 13/90* (2014.09); *G07F 17/3246* (2013.01); *G07F 17/3251* (2013.01); *G09G 5/003* (2013.01); *G09G 2380/02* (2013.01)

(58) Field of Classification Search
CPC ................ G08B 5/00; G09G 3/00; G09F 1/00
See application file for complete search history.

(56) References Cited

U.S. PATENT DOCUMENTS

| | | | | |
|---|---|---|---|---|
| 5,451,842 | A | * | 9/1995 | Chien .................... A47G 33/08 315/169.3 |
| 5,533,289 | A | * | 7/1996 | Hoffman ................ B60Q 1/503 40/544 |

(Continued)

FOREIGN PATENT DOCUMENTS

WO WO-2004012177 A1 * 2/2004 ......... G07F 17/3202

OTHER PUBLICATIONS

AU Examination Report in AU Application No. 2018204220, dated Jul. 17, 2019. 4 Pages.

*Primary Examiner* — Seng H Lim
(74) *Attorney, Agent, or Firm* — Armstrong Teasdale LLP

(57) ABSTRACT

An electroluminescent display includes a flexible display material shaped to cover a designated portion of an electronic gaming system. In various embodiments, the flexible display material includes an appliable backing configured to be removably applied to the designated portion of the electronic gaming system, a graphics layer including a plurality of graphics regions, each graphics region of the plurality of graphics regions having an associated shape, and a plurality of electroluminescent (EL) display elements disposed between the appliable backing and the graphics layer, each EL display element of the plurality of EL display elements shaped to correspond to a shape of one of the plurality of graphics regions, the plurality of EL display elements configured to back-illuminate the plurality of graphics regions.

18 Claims, 10 Drawing Sheets

(56) References Cited

U.S. PATENT DOCUMENTS

| | | | |
|---|---|---|---|
| 5,572,817 A * | 11/1996 | Chien | F21S 8/035 |
| | | | 40/544 |
| 5,847,948 A | 12/1998 | Gatto et al. | |
| 6,027,115 A | 2/2000 | Griswold et al. | |
| 6,344,906 B1 | 2/2002 | Gatto et al. | |
| 6,834,452 B2 * | 12/2004 | Martin | G07F 9/023 |
| | | | 221/8 |
| 6,835,133 B2 | 12/2004 | Baerlocher et al. | |
| 7,404,751 B2 | 7/2008 | Handa et al. | |
| 7,596,899 B1 * | 10/2009 | Michael | G09F 19/22 |
| | | | 362/249.04 |
| 7,597,619 B2 | 10/2009 | Crivelli et al. | |
| 7,682,249 B2 | 3/2010 | Winans et al. | |
| 7,744,460 B2 | 6/2010 | Walker et al. | |
| 7,811,170 B2 | 10/2010 | Winans et al. | |
| 7,837,562 B2 | 11/2010 | Griswold et al. | |
| 7,887,408 B2 | 2/2011 | Walker et al. | |
| 8,002,624 B2 | 8/2011 | Paulsen et al. | |
| 8,092,304 B2 | 1/2012 | Hedrick et al. | |
| 8,118,670 B2 | 2/2012 | Griswold et al. | |
| 8,192,281 B2 | 6/2012 | Williams et al. | |
| 8,199,068 B2 | 6/2012 | Williams et al. | |
| 8,210,922 B2 | 7/2012 | Williams et al. | |
| 8,257,175 B2 | 9/2012 | Malice et al. | |
| 8,303,407 B2 | 11/2012 | Griswold et al. | |
| 8,357,033 B2 | 1/2013 | Williams et al. | |
| 8,388,432 B2 | 3/2013 | Malice et al. | |
| 8,480,474 B2 | 7/2013 | Randall et al. | |
| 8,496,518 B2 | 7/2013 | Malice et al. | |
| 8,512,139 B2 | 8/2013 | Williams et al. | |
| 8,529,341 B2 | 9/2013 | Griswold et al. | |
| 8,545,326 B2 | 10/2013 | Underdahl et al. | |
| 8,562,424 B2 | 10/2013 | Walker et al. | |
| 8,597,115 B2 | 12/2013 | Sammon et al. | |
| 8,708,820 B2 | 4/2014 | Mattice et al. | |
| 8,715,058 B2 | 5/2014 | Pennington et al. | |
| 8,758,144 B2 | 6/2014 | Williams et al. | |
| 8,864,567 B2 | 10/2014 | Underdahl et al. | |
| 9,082,256 B2 | 7/2015 | Griswold et al. | |
| 9,335,869 B2 | 5/2016 | Mattice et al. | |
| 2002/0081468 A1 | 6/2002 | Shioya | |
| 2002/0142830 A1 | 10/2002 | Adams | |
| 2002/0160826 A1 * | 10/2002 | Gomez | G07F 17/32 |
| | | | 463/16 |
| 2002/0173354 A1 | 11/2002 | Winans et al. | |
| 2003/0027631 A1 | 2/2003 | Hedrick et al. | |
| 2003/0036418 A1 | 2/2003 | Seelig et al. | |
| 2003/0087689 A1 | 5/2003 | Adams | |
| 2003/0130033 A1 * | 7/2003 | Loose | G07F 17/32 |
| | | | 463/30 |
| 2003/0150146 A1 * | 8/2003 | Martin | G09F 13/22 |
| | | | 40/544 |
| 2003/0220134 A1 | 11/2003 | Walker et al. | |
| 2004/0053695 A1 * | 3/2004 | Mattice | G07F 17/32 |
| | | | 463/42 |
| 2004/0102241 A1 | 5/2004 | Kaminkow | |
| 2004/0266536 A1 | 12/2004 | Mattice et al. | |
| 2005/0059487 A1 | 3/2005 | Wilder et al. | |
| 2005/0060051 A1 | 3/2005 | Mattice et al. | |
| 2005/0090311 A1 * | 4/2005 | Allitt | G07F 17/3202 |
| | | | 463/31 |
| 2005/0176509 A1 * | 8/2005 | Hirato | G07F 17/32 |
| | | | 463/46 |
| 2006/0090384 A1 * | 5/2006 | Woodruff | G09F 7/12 |
| | | | 40/544 |
| 2006/0100014 A1 | 5/2006 | Griswold et al. | |
| 2006/0199638 A1 | 9/2006 | Walker et al. | |
| 2007/0004513 A1 | 1/2007 | Wells et al. | |
| 2007/0054730 A1 | 3/2007 | Mattice et al. | |
| 2007/0093290 A1 | 4/2007 | Winans et al. | |
| 2008/0020816 A1 | 1/2008 | Griswold et al. | |
| 2008/0020841 A1 | 1/2008 | Wells et al. | |
| 2008/0064497 A1 | 3/2008 | Griswold et al. | |
| 2008/0113748 A1 | 5/2008 | Williams et al. | |
| 2008/0119265 A1 | 5/2008 | Mattice et al. | |
| 2008/0125219 A1 | 5/2008 | Williams et al. | |
| 2008/0136741 A1 | 6/2008 | Williams et al. | |
| 2008/0161100 A1 | 7/2008 | Mattice et al. | |
| 2009/0061983 A1 | 3/2009 | Kaufman | |
| 2009/0079667 A1 | 3/2009 | Schlottmann et al. | |
| 2009/0104969 A1 | 4/2009 | Paulsen et al. | |
| 2009/0131168 A1 | 5/2009 | Waxman et al. | |
| 2009/0143141 A1 | 6/2009 | Wells et al. | |
| 2009/0253509 A1 * | 10/2009 | Tripp | A63F 13/06 |
| | | | 463/37 |
| 2010/0304841 A1 | 12/2010 | Sammon et al. | |
| 2011/0119974 A1 * | 5/2011 | Golle | G09F 13/22 |
| | | | 40/544 |
| 2011/0143836 A1 * | 6/2011 | Allitt | G07F 17/3202 |
| | | | 463/31 |
| 2012/0184367 A1 | 7/2012 | Parrott et al. | |
| 2012/0266507 A1 * | 10/2012 | Pendlebury | G09F 13/22 |
| | | | 40/544 |
| 2013/0102376 A1 | 4/2013 | Paulsen et al. | |
| 2013/0130774 A1 | 5/2013 | Williams et al. | |
| 2014/0018150 A1 | 1/2014 | Wells et al. | |
| 2014/0045584 A1 | 2/2014 | Walker et al. | |
| 2014/0073415 A1 | 3/2014 | Sammon et al. | |
| 2014/0292203 A1 * | 10/2014 | Ackerman | H05B 37/0236 |
| | | | 315/129 |
| 2015/0161848 A1 | 6/2015 | Walker et al. | |
| 2015/0221244 A1 * | 8/2015 | Miller | G09F 9/301 |
| | | | 705/310 |
| 2015/0294532 A1 | 10/2015 | Walker et al. | |
| 2016/0246443 A1 | 8/2016 | Mattice et al. | |
| 2016/0246444 A1 | 8/2016 | Mattice et al. | |
| 2016/0351015 A1 | 12/2016 | Walker et al. | |
| 2017/0249878 A1 * | 8/2017 | Frey | G09G 3/00 |
| 2019/0225143 A1 * | 7/2019 | Severinski | B60N 2/58 |

\* cited by examiner

FLEXIBLE ELECTROLUMINESCENT DISPLAY FOR USE WITH ELECTRONIC GAMING SYSTEMS

BACKGROUND

Many conventional electronic gaming systems (e.g., slot machines) include displays. These displays are most often used to show a variety of game related data, such as, for example, game outcomes, video animations, and/or promotional offers. Traditionally, gaming machine displays are solid panel displays (such as CRT, LCD, and plasma displays) and do not cover over the entire surface area of a gaming system. Thus, many conventional gaming systems include one or more non-display (or "blank") surfaces, such as one or more non-display surfaces exposed within a seating area, surfaces of exposed cabinetry (including non-display surfaces of traditional solid panel displays), surfaces of exposed shelving, and the like.

BRIEF DESCRIPTION

In one aspect, an electroluminescent display is provided. The electroluminescent display includes a flexible display material shaped to cover a designated portion of an electronic gaming system. In various embodiments, the flexible display material includes an appliable backing configured to be removably applied to the designated portion of the electronic gaming system, a graphics layer including a plurality of graphics regions, each graphics region of the plurality of graphics regions having an associated shape, and a plurality of electroluminescent (EL) display elements disposed between the appliable backing and the graphics layer, each EL display element of the plurality of EL display elements shaped to correspond to a shape of one of the plurality of graphics regions, the plurality of EL display elements configured to back-illuminate the plurality of graphics regions.

In another aspect, an electroluminescent display is provided. The electroluminescent display includes a controller, an appliable backing, a graphics layer, and a plurality of electroluminescent (EL) display elements disposed between the flexible magnetic backing and the graphics layer, each of the plurality of EL display elements defining an electroluminescent region, each electroluminescent region configured to back-illuminate at least a portion of the graphics layer. The electroluminescent display also includes at least one electrically conductive trace coupled between the controller and at least one EL display element of the plurality of EL display elements, the at least one electrically conductive trace configured to supply electrical power to the at least one EL display element in response to a control signal generated by the controller.

In yet another aspect, an electronic gaming system is provided. The electronic gaming system includes a display configured to display a wagering game, a player input interface configured to receive a player input, a credit input mechanism including at least one of a card reader, a ticket reader, a bill acceptor, and a coin input mechanism, the credit input mechanism configured to receive a credit wager, the credit wager initiating play of the wagering game, a game controller for controlling the wagering game, and a flexible electroluminescent display configured to be applied to a designated portion of the electronic gaming system. The flexible electroluminescent display includes an appliable backing configured to be removably applied to the designated portion of the electronic gaming system, a graphics layer including a plurality of graphics regions, each graphics region of the plurality of graphics regions having an associated shape, and a plurality of electroluminescent (EL) display elements disposed between the appliable backing and the graphics layer, each EL display element of the plurality of EL display elements shaped to correspond to a shape of one of the plurality of graphics regions, the plurality of EL display elements configured to back-illuminate the plurality of graphics regions.

In yet another aspect, a method of manufacturing an electroluminescent display for use with an electronic gaming system is provided. The method includes shaping an electroluminescent (EL) display element to correspond to a shape of a region to be illuminated, the region to be illuminated printed on a graphics layer of the electroluminescent display, electrically coupling the EL display element to at least one electrically conductive trace, the electrically conductive trace configured to be coupled to a controller, and laminating the EL display element and the at least one electrically conductive trace between the graphics layer and an appliable backing, the appliable backing configured to be applied to a surface of the electronic gaming system.

BRIEF DESCRIPTION OF THE DRAWINGS

An exemplary embodiment of the subject matter disclosed will now be described with reference to the accompanying drawings.

DETAILED DESCRIPTION

Figure 1:
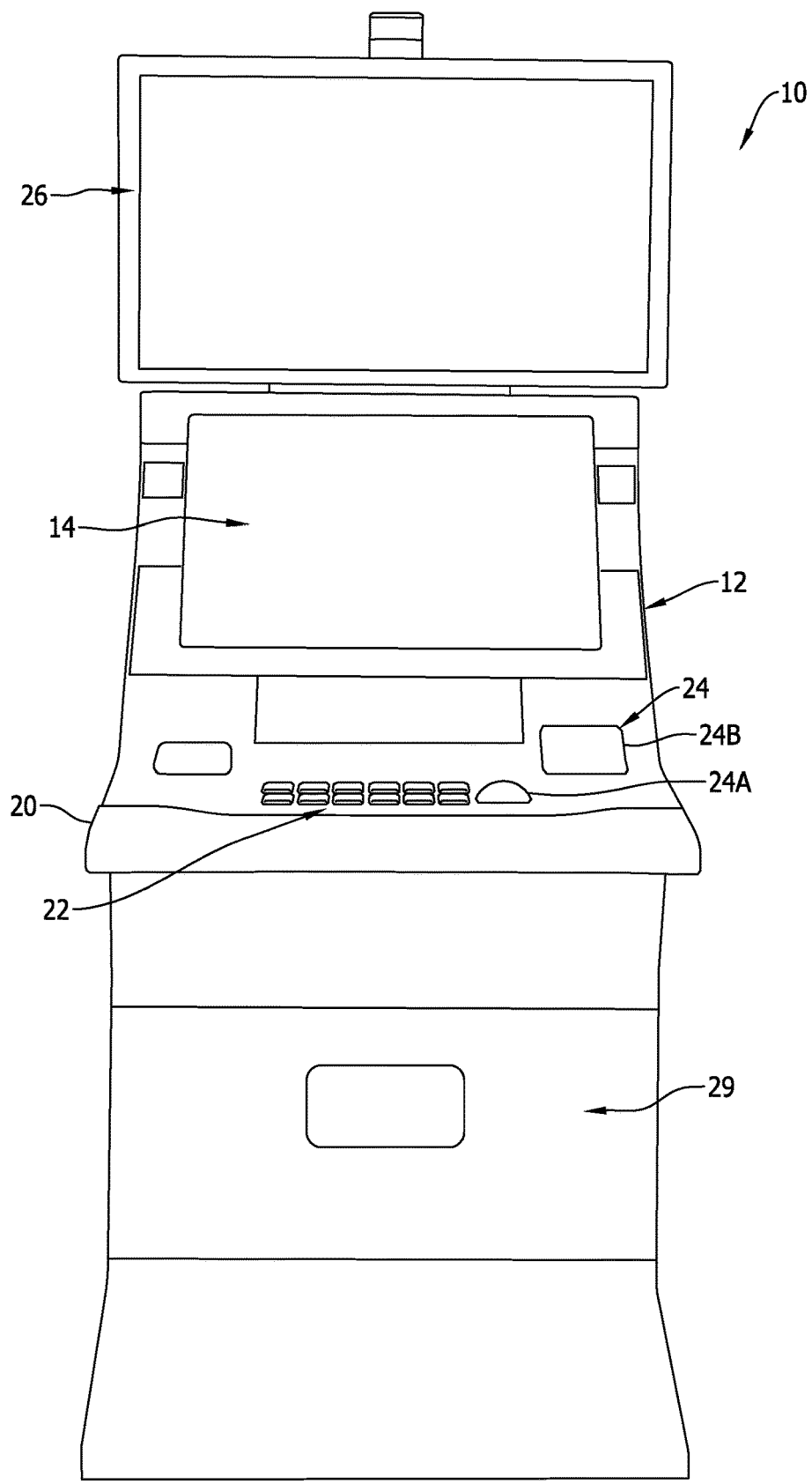
FIG. 1 is a perspective view of an exemplary gaming machine.

The subject matter of the present disclosure relates to an electroluminescent display, and more particularly, to a flexible electroluminescent display for use with an electronic gaming system. The electroluminescent display includes a plurality of shaped electroluminescent (EL) display elements and a flexible backing, such as a flexible magnetic backing, configured to be removably applied to a blank surface of the electronic gaming system.

Many conventional electronic gaming systems (e.g., slot machines) include displays. These displays are most often used to show a variety of game related data, such as, for example, game outcomes, video animations, and/or promotional offers. Traditionally, gaming machine displays are solid panel displays (such as CRT, LCD, and plasma displays) and do not cover over the entire surface area of a gaming system. Thus, many conventional gaming systems include one or more non-display (or "blank") surfaces, such as one or more non-display surfaces exposed within a seating area, surfaces of exposed cabinetry (including non-display surfaces of traditional solid panel displays), surfaces of exposed shelving, and the like.

To make use of such surfaces, an electroluminescent display, as described herein, is desirable. More particularly, a flexible electroluminescent display capable of being removably applied to an exposed or blank surface of an electronic gaming system is desirable. To this end, in at least one embodiment, the electroluminescent display described herein is a flexible material, which may be customized and shaped to cover at least a portion of a blank surface of an electronic gaming system. Examples include a flexible electroluminescent display shaped to fit over at least a portion of a seating area, including, in some embodiments, one or more seat cushions and/or one or more seatbacks, and a flexible electroluminescent display shaped to fit over at least a portion of an exposed cabinet, including, in some embodiments, a non-display surface of a traditional solid panel display.

Accordingly, exemplary embodiments of the present disclosure include an electroluminescent display configured as a flexible material and suitable for application to a non-display (or "blank") surface of an electronic gaming system. For example, in various embodiments, the electroluminescent display includes a magnetic and/or an adhesive backing and is configured to be removably applied to a blank surface of a gaming machine, a blank surface of a seating area (such as a seatback and/or a seat cushion), and the like. The electroluminescent display further includes a graphics layer having one or more graphics regions, each associated with a shape. Each of a plurality of electroluminescent display elements may be shaped (e.g., cut or otherwise manufactured) to correspond to a shape of a particular graphics region and coupled between the backing and a graphics layer to back-illuminate a particular graphics region during operation. Thus, the electroluminescent display described herein is flexible and may be removably applied to an unused blank surface of an electronic gaming system to repurpose the surface, under operating conditions, as a display unto itself.

FIGS. 1-5 generally relate to an exemplary gaming machine and an exemplary network of gaming machines and are intended, in part, to provide a backdrop against which the electroluminescent display described herein may be understood. For example, an electroluminescent display, as described herein, may be deployed in conjunction with one or more gaming machines, one or more networks of gaming machines, and the like. In some cases, the electroluminescent display may be coupled to one or more gaming machines or networks of gaming machines. For instance, the electroluminescent display may be communicatively coupled to a gaming machine or a bank of gaming machines, such that the one or more gaming machines are operable to provide control instructions or control signals to the electroluminescent display.

Accordingly, gaming machines of the present disclosure may be implemented in various configurations for gaming machines, including but not limited to: (1) a gaming machine in which the computerized instructions for controlling one or more games are stored within the gaming machine prior to delivery to a gaming establishment; and/or (2) a changeable gaming machine in which the computerized instructions for controlling one or more games are subsequently downloaded to the gaming machine through a data network after the gaming machine is installed within in a gaming establishment.

In an exemplary embodiment, the computerized instructions for controlling one or more games may be executed by a server, such as, for example, a central controller or remote host. In such a "thin client" architecture, the server may remotely control one or more games, or other suitable interfaces, via a gaming network, and the gaming machine may be used to display the games, or suitable interfaces, and to receive inputs or commands from a player.

In another exemplary embodiment, the instructions for controlling one or more games are communicated from a server to a local processor and memory coupled within a gaming machine. In such a "thick client" architecture, a processor of the gaming machine may execute the communicated instructions to control the game or games and/or other suitable interfaces provided to a player.

In another exemplary embodiment, one or more gaming machines within a gaming machine network may utilize a thin client architecture and one or more gaming machines within a gaming machine network may utilize a thick client architecture. Similarly, in various exemplary embodiments, certain functions of a particular gaming machine may be implemented in a thin client architecture and certain other functions of the gaming machine may be implemented in a thick client architecture. For instance, instructions for controlling a game or games may be communicated from a server to one or more network gaming machines operating in a thick client configuration, while instructions for controlling any secondary games or bonus gaming functions may executed by the server in a thin client configuration.

FIG. 1 is a perspective view of an exemplary gaming machine 10. Gaming machine 10 may include a support structure, housing, console or cabinet 12 that provides support for a plurality of interface units, displays, inputs, controls and other features of a conventional gaming machine. Gaming machine 10 may be configured so that a player can operate it while standing or sitting. Moreover, gaming machine 10 may be positioned on a base or stand, or can be configured as a pub-style table-top game (not shown) that a player can operate while seated. Gaming machine 10 may include varying numbers and styles of cabinets 12, display configurations, and the like without departing from the scope of the present disclosure.

In an exemplary embodiment, gaming machine 10 may include a display 14. Gaming machine 10 may further include a mid-trim 20, which may house a bank of buttons 22 for enabling a player to interact with gaming machine 10 and/or a credit input mechanism 24.

Gaming machine 10 may also include a player marketing module configured to scan or read a player identifying device, such as, for example a loyalty or player tracking card implemented within a casino as part of a loyalty program. The player identifying device may be in the form of a card, flash drive, and/or any other portable storage medium capable of being read by the reading device. In some embodiments, the player marketing module may be configured to transfer credits between gaming machine 10 and the player tracking device.

Gaming machine 10 may further include a top box 26, which may, in turn, include artwork, such as, for example, artwork depicting one or more pay tables, bonus award information, an upper display (not shown), and/or other game information or imagery. Further artwork and/or information may be provided on a front panel 29 of console 12. A coin tray (not shown) may be mounted beneath front panel 29 for dispensing cash payouts from gaming machine 10.

Display 14 may include, without limitation, a monitor, a plasma display, a liquid crystal display (LCD) a display based on light emitting diodes (LED), a display based on a plurality of organic light-emitting diodes (OLEDs), a display based on polymer light-emitting diodes (PLEDs), a display based on a plurality of surface-conduction electron-emitters (SEDs), a display including a projected and/or reflected image or any other suitable electronic device or display mechanism. In an exemplary embodiment, display 14 includes a touch-screen or touch-sensitive screen. In various embodiments, display 14 may be of any suitable size and configuration, such as any circular, square, rectangular, or other geometric configuration.

Display 14 may be further configured to provide haptic feedback. Top box 26 may also include a display, which may be of the same or different from display 14.

Display 14 may, in various embodiments, display a game and/or accept game play data from a player. Moreover, display 14 may also display information relating to an interactive game, wager triggering event, or wagering outcome. In an exemplary embodiment, an upper display (not shown) mounted in top box 26 may display any wagering outcome, any suitable secondary game associated or not associated with the interactive game, or any information relating to the interactive games. The upper display may also be configured to accept game play data from a player.

Display 14 may, in addition, serve as digital signage operable to advertise one or more games or other aspects of the gaming establishment. In an exemplary embodiment, gaming machine 10 may also include a credit or fund display 20, which may display a player's current number of credits, cash accumulated, account balance, an original number of credits the player funded the gaming machine with, or an equivalent of any of the aforementioned, and the like. Moreover, in an exemplary embodiment, display 14 may display an amount being wagered or a player's accumulated winnings.

In an exemplary embodiment, and as described in greater detail herein, display 14 may display at least one game or game image, game symbol or symbols, and game indicia, such as any visual representation or exhibition of a movement of objects, including, for example, any mechanical, virtual, or video reels and wheels, dynamic lighting, video images, images of people, characters, places, things and faces of cards, and the like. In various embodiments, the symbols, images and indicia described above may be displayed mechanically, such as by one or more mechanical or physical reels. In other words, display 14 may include any electromechanical device, such as one or more rotatable or spinning wheels, reels or dice, any of which may be configured to display at least one or a plurality of games or other suitable images, symbols or indicia.

Figure 2:
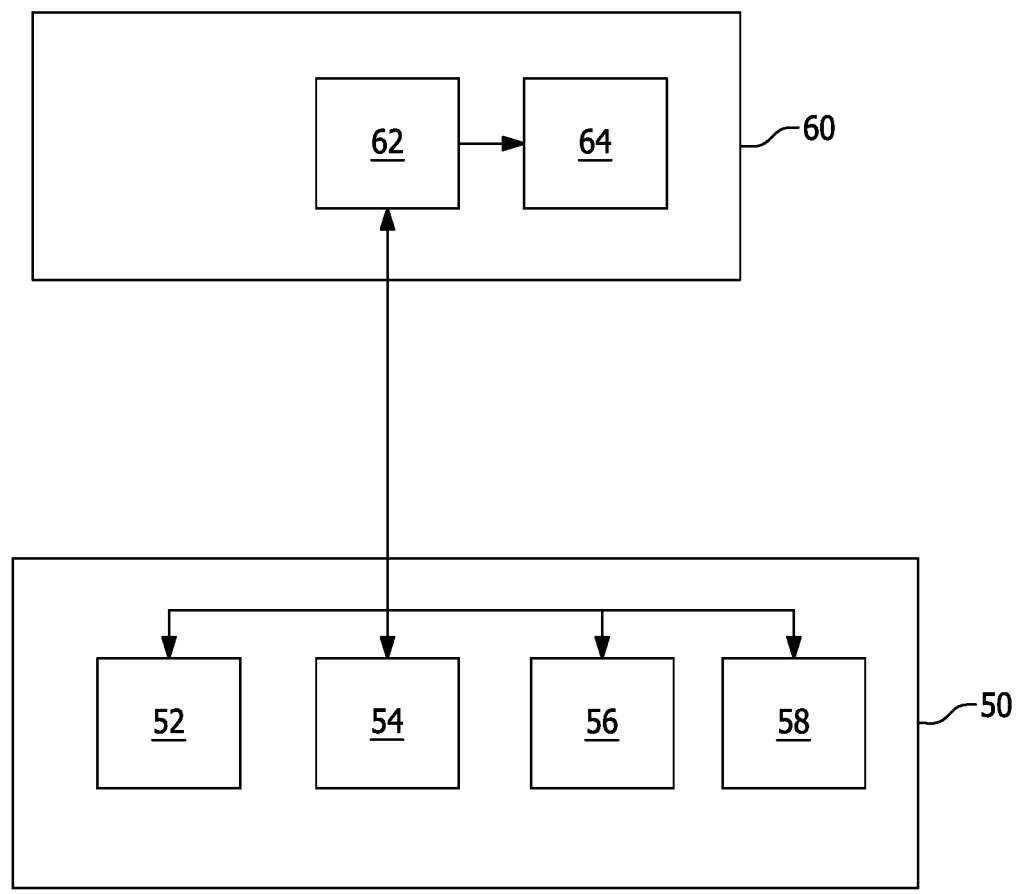
FIG. 2 is a block diagram of exemplary components of a gaming machine.

FIG. 2 is a block diagram of an exemplary player interface 50 and game controller 60 of gaming machine 10. Player interface 50 and game controller 60 may be housed within gaming machine 10, such as on a printed circuit board located within cabinet 12 of gaming machine 10. As described herein, player interface 50 may be arranged to enable manual interaction between a player and the gaming system and for this purpose includes various input/output components required for the player to enter instructions to play the game and observe the game outcomes.

Components of player interface 50 may include at least one credit input mechanism 52, at least one display 54, a game play mechanism 56 (including one or more input devices that enable a player to input game play instructions or place a wager), and/or one or more audio output devices 58 (e.g., one or more speakers).

Game controller 60 may be in data communication with player interface 50 and may include at least one processor 62 or other suitable controller, such as a microprocessor, a microcontroller-based platform, a suitable integrated circuit or one or more application-specific integrated circuits (ASICs). Processor 62 may be coupled in communication with, or may be operable to access or to exchange signals with, at least one data storage module or memory 64. Processor 62 may thus be configured to retrieve game play instructions from memory 64, process the game play instructions in accordance with game play rules, and output one or more game play outcomes to display 14.

Memory 64 may include any suitable tangible, non-transitory, computer-readable storage medium. Memory 64 may store program code and instructions, executable by processor 62, to control gaming machine 10. Memory 64 may also store other data, such as, for example, image data, one or more pay tables or pay table data, event data, player input data, a random or pseudo-random number generator, or numbers generated by a random number or pseudo-random number generator, look-up table data, and/or information and applicable game rules that relate to the play of gaming machine 10.

Figure 3:
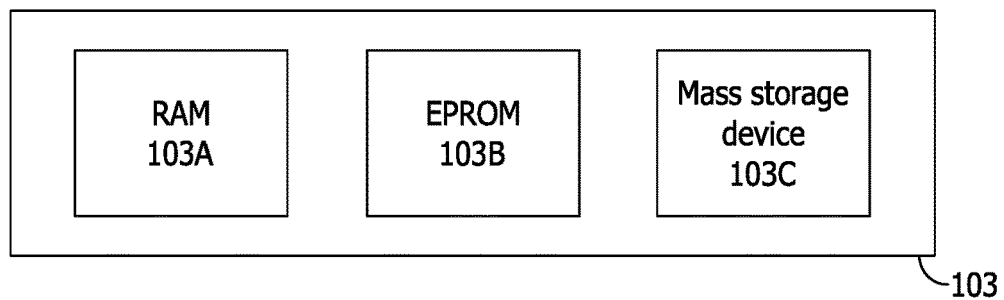
FIG. 3 is a block diagram of exemplary components of a gaming machine.

With brief attention to FIG. 3, a block diagram of memory 64 is shown. Memory 64 may, in various embodiments, include a memory 103 (as described herein with reference to FIG. 3). Memory 103 may include random access memory (RAM) 103A, such as dynamic random access memory (DRAM), synchronous DRAM (SDRAM), non-volatile RAM (NVRAM), magnetic RAM (MRAM), ferroelectric RAM (FeRAM) and other forms as commonly understood in the gaming industry. Memory 103 may further include read only memory (ROM), such as erasable programmable read only memory (EPROM) 103B or electrically erasable programmable read only memory (EEPROM). Memory 64 may further include one or more mass storage devices 103C, such as one or more magnetic hard disk drives (HDD), one or more solid state drive (SSD) or flash memory components, one or more optical disk drive (ODD) such as a compact disk (CD) and/or digital video disk (DVD) drives, and the like. Any other suitable magnetic, optical, and/or semiconductor memory may be used to operate in conjunction with gaming machine 10 that enables gaming machine 10 to function as described herein.

In an exemplary embodiment, RAM 103A may temporarily store one or more program files (and/or other related data) for execution by processor 62. EPROM 103B may include a boot ROM device and/or may contain some system or game related code. Mass storage device 103C may store one or more game programs, the integrity of which may be verified and/or authenticated by the processor 62 through the use of protected or encrypted code stored, for example, on EPROM 103B.

In various embodiments, part or all of the program code and/or operating data described above is stored in a detachable or removable memory, including, but not limited to, a suitable cartridge, disk, CD ROM, DVD or USB memory device. In addition, in various embodiments, all or part of the program code and/or operating data described above may be downloadable to memory 64 by way of any suitable computer network.

In an exemplary embodiment, a desktop computer, a laptop personal computer, a personal digital assistant (PDA), a smartphone, a tablet computing device or other portable computing device, and/or any other computerized platform may implement the computing operations of the present disclosure. For example, any suitable mobile computing device, such as any smartphone or tablet computing device, may implement and enable gameplay as described herein. It should be appreciated that each gaming machine 10 disclosed herein may include a device that has obtained approval from a regulatory gaming commission or a device that has not obtained approval from a regulatory gaming commission. It should also be appreciated that processor 62 and memory 64 may be collectively referred to herein as a "computer" or "controller."

Returning briefly to FIG. 1, in an exemplary embodiment, credit input mechanism 24 may be coupled in communication with processor 62. Credit input mechanism 24 may include any suitable credit input mechanism or device, such as a coin acceptor input chute 24A, a bill or ticket collector 24B, and the like. Credit input mechanism may be configured to receive any suitable monetary credit, such as money, coins, tokens, tickets, and the like. In various embodiments, credit input mechanism 24 may further include card reader devices, such as credit or debit card readers or validators for credit cards, debit cards, printed ticket readers, and the like.

In various embodiments, a player may insert an identification card (not shown) into a card reader of gaming machine 10. The identification card may be a smart card that includes a programmed microchip or a magnetic strip coded with a player's identification, credit totals (or related data) and other relevant information. A player may further carry a portable device, such as a cell phone or smart phone, a radio frequency identification tag or any other suitable wireless communication device, which communicates a player's identification, credit totals (or related data) and other relevant information to gaming machine 10. In an embodiment, money may be transferred to gaming machine 10 via an electronic funds transfer process. When a player funds gaming machine 10, processor 62 may determine an amount of funds entered and display the corresponding amount on the display 14.

Game play mechanism 56 may include at least one input device that is coupled in communication with processor 62. An input device may include any device that enables a player to produce an input signal that is receivable by processor 62. For example, in one embodiment, after funding gaming machine 10, the input device may include a game activation device, such as a pull arm or one or more play button 22 that enables the player to start the game or a sequence of events in gaming machine 10. Play button 22 may include any suitable play activator such as a bet one button, a max bet button, or a repeat the bet button. In an embodiment, after appropriate funding of gaming machine 10, game play may begin automatically.

In an exemplary embodiment, one input device may include a "Bet One" button. A player may place a wager or bet by pushing the Bet One button and may increase the wager by repeatedly depressing or selecting the Bet One button. In various embodiments, an input device includes a "Bet Max" button that enables a player to place a maximum wager permitted during a particular game or game session.

In various embodiments, an input device may also include a "Cash Out" button. A player may depress or select the Cash Out button to receive a cash payment or other suitable form of payment corresponding to the number of credits remaining. In an embodiment, when the player cashes out, the player receives coins or tokens in a coin payout tray. A player may further receive tickets or credit slips, or the player's electronically recordable identification card may be funded, in response to selection of the Cash Out button.

In various embodiments, an input device may include a touch-screen that is coupled to a touch-screen controller, or some other touch-sensitive display overlay, to enable player interaction with images presented on display 14. A touch-screen and/or touch-screen controller may be communicatively coupled to a video controller, such that a player may provide input signals to gaming machine 10 by physically manipulating or interacting with the touch-screen.

Gaming machine 10 may include a sensor, such as a camera (not shown) coupled in communication with processor 62. The camera may, in various embodiments, be controlled by processor 62, such that a player may direct the orientation and focus of the camera to acquire an image of a player actively playing gaming machine 10 and/or a surrounding area of gaming machine 10. In an exemplary embodiment, the camera may selectively acquire still or moving (e.g., video) images and may be configured to acquire the images in either an analog, digital, or other suitable format. Display 14 may be configured to display the image acquired by the camera, as well as to display the visible manifestation of the game in split screen or picture-in-picture fashion. For example, the camera may acquire an image of the player and processor 62 may incorporate that image into the interactive and/or secondary game as a game image, symbol or indicia.

Figure 4:
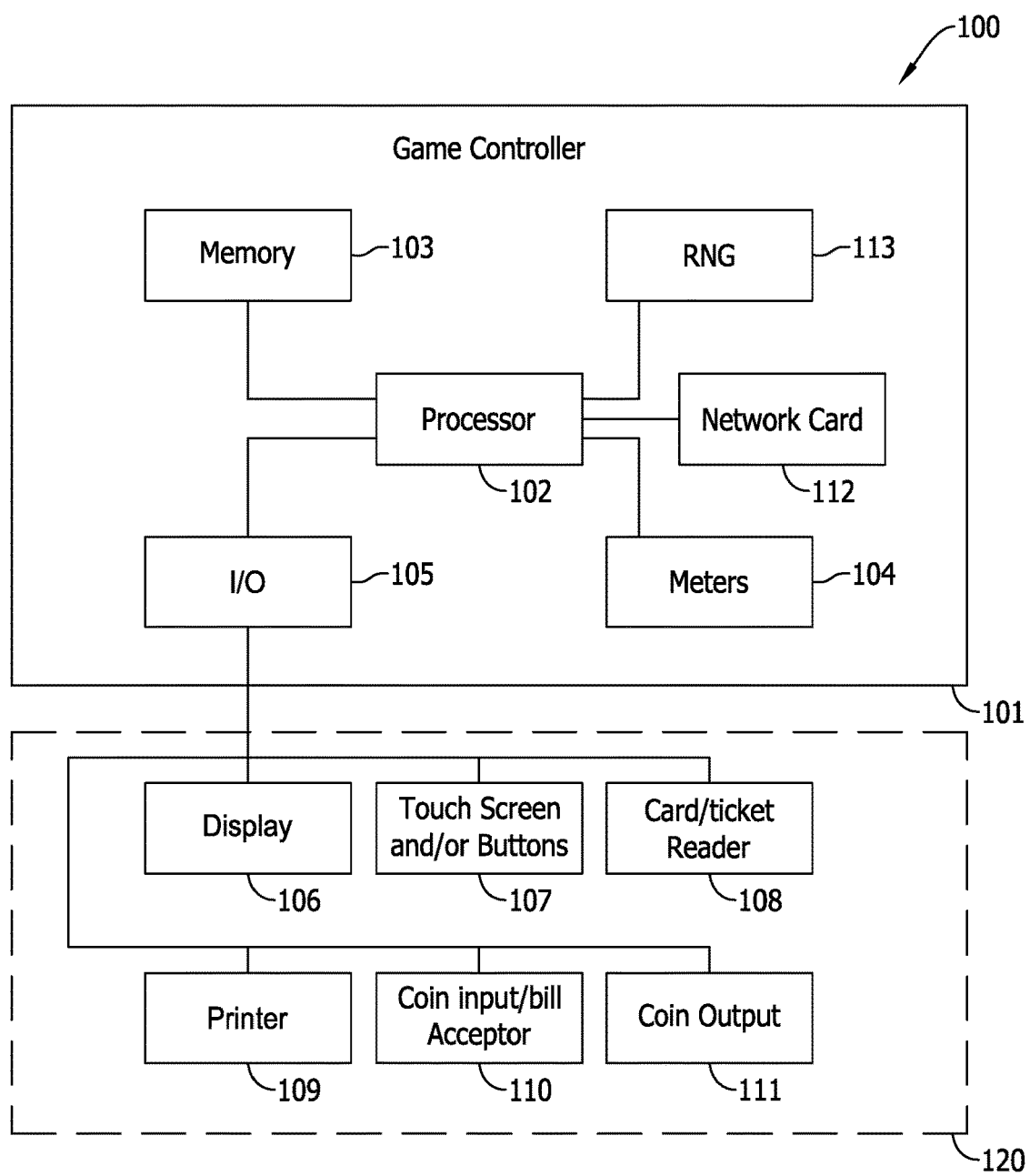
FIG. 4 is a schematic diagram of exemplary components of a memory.

FIG. 4 illustrates a more detailed block diagram of various exemplary functional components of a gaming machine 100, which may be the same as or different from gaming machine 10 (as shown in FIG. 2). The foregoing description of components (e.g., display 14, player interface 50, and game controller 60) may therefore apply to the description of similar components in gaming machine 100. For instance, processor 62 may be the same as or different from 102, as described below. Similarly, memory 64 may be the same as or different from memory 103 as described below.

Accordingly, gaming machine 100 may include a game controller 101 (which may include a processor 102 mounted on a circuit board, as described in greater detail above). Instructions and data to control operation of processor 102 may be stored in a memory 103 that is in data communication with processor 102. Gaming machine 100 may include both volatile and non-volatile memory and more than one of each type of memory, with such memories being collectively represented by memory 103.

Gaming machine 100 may further include gaming meters 104, that can be implemented by software (e.g. memory) or hardware (e.g. electromechanical) and can be used to ensure regulatory compliance and to monitor player wagering, and/or an input/output (I/O) interface 105 (for communicating with peripheral devices of gaming machine 100). Input/output interface 105 and/or the peripheral devices may include intelligent devices with their own memory for storing associated instructions and data. A random number generator (RNG) module 113 may generate random numbers for use by processor 102. Persons skilled in the art will appreciate that random number generator module 113 includes a pseudo-random number generator.

In an exemplary embodiment, a player interface 120 includes peripheral devices that communicate with game controller 101 including one or more displays 106, a touch screen and/or input buttons 107 (which provide a game play mechanism), and a credit input mechanism, such as a card and/or ticket reader 108, a bill acceptor and/or coin input mechanism 110. The credit input mechanism is configured to receive a credit wager to initiate play of a base game, and establish a credit balance (e.g., using the received credit wager) that is increasable and decreasable based on wagering activity within a game. Player interface 120 also includes a payout mechanism such as a printer 109 and/or a coin output mechanism 111. The payout mechanism is configured to output a payout to a player of gaming machine 100 based on an outcome of the game (e.g., a base game and/or a feature game).

Additional hardware may be included as part of gaming machine 100, or hardware may be omitted as required for the specific implementation. For example, although buttons or touch screens are typically used in gaming machines to allow a player to place a wager and to initiate a play of a game any input device that enables the player to input game play instructions may be used. For example, in some gaming machines a mechanical handle may be used to initiate a play of the game. Persons skilled in the art will also appreciate that a touch screen can be used to emulate other input devices, such as, for example, a touch screen that can display virtual buttons that a player can "press" by touching the screen where they are displayed.

In addition, gaming machine 100 may include a communications interface, such as, for example a network card 112. Network card 112 may, for example, send status information, accounting information and/or other information to a bonus controller, central controller, server or database and receive data or commands from the bonus controller, central controller, an/or server or database. In various embodiments (e.g., embodiments that employ a player marketing module), communications over a network may be via the player marketing module—e.g., the player marketing module may be in data communication with one or more of the above devices.

In various embodiments, components of gaming machine 100 may be distributed. For example, in an embodiment, input/output devices 106, 107, 108, 109, 110, and 111 may be provided remotely from game controller 101.

Figure 5:
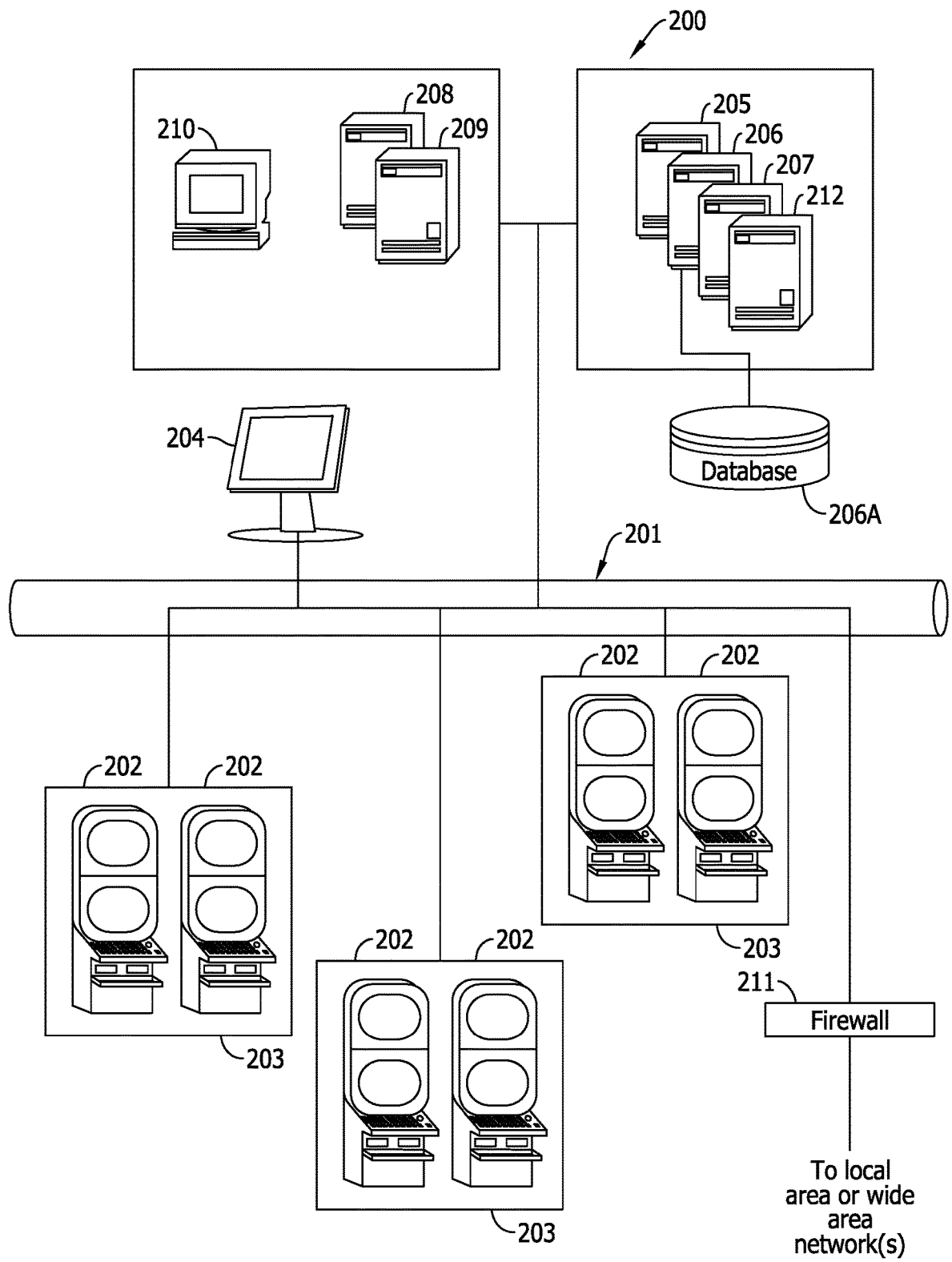
FIG. 5 is a schematic diagram of an exemplary network gaming system.

FIG. 5 illustrates such an exemplary distributed gaming system 200. Gaming system 200 may include a network 201, which, for example, may include a wired or wireless network, such as a Wi-Fi or BLUETOOTH network, an Ethernet network, an RS-232 network, and/or any combination thereof. In an exemplary embodiment, gaming machines 202, shown arranged in three banks 203 of two gaming machines 202, are connected to network 201. Gaming machines 202 may provide a player operable interface and may be the same as (or substantially similar to) the gaming machines 10 and 100 (as shown in FIGS. 2 and 3), or may have simplified functionality depending, for example, on various game play requirements.

One or more displays 204 may also be connected to network 201. For example, displays 204 may be associated with one or more banks 203 of gaming machines. Displays 204 may be used to display representations associated with game play on gaming machines 202 and/or used to display other representations, such as, for example promotional or informational material. Displays 204 may be the same as or substantially similar to display 14, as described above.

In a thick client embodiment, game server 205 may implement part of the game played by a player using gaming machine 202, and gaming machine 202 may implement part of the game. In such an embodiment, insofar as both game server 205 and gaming machine 202 may implement part of the game, they may collectively include a game controller. A database management server 206 may manage storage of game programs and associated data for downloading or access by gaming machines 202 in a database 206A. Typically, if gaming system 200 enables players to participate in a jackpot game, a jackpot server 207 may be provided to perform accounting functions for the jackpot game. A player tracking/loyalty program server 212 may also be provided.

In a thin client embodiment, game server 205 may implement most or all of the game played by a player using gaming machine 202, and gaming machine 202 may, in essence, functionally provide little more than the player interface. In such an embodiment, game server 205 may include the game controller. Gaming machine 202 may thus receive player instructions and transmit those instructions to game server 205. Further, in a thin client embodiment, gaming machines 202 may be computer terminals, such as, for example, personal computers, laptop computers, tablet computing devices, smartphones, and the like running software that provides a player interface. Other client/server configurations are contemplated and are within the scope of this disclosure. Additional details of a client/server architecture may be found in WO 2006/052213 and PCT/SE2006/000559, the disclosures of which are incorporated herein by reference in their entireties.

One or more servers may be provided to assist in the administration of gaming system 200. Such servers may include, for example, a gaming floor management server 208, and a licensing server 209 to monitor the use of licenses relating to particular games. An administrator terminal 210 may be provided to allow an administrator to run network 201 and the devices connected to network 201.

Gaming system 200 may communicate with other gaming systems and/or other local networks, such as, for example a corporate network, and/or a wide area network such as the Internet. Network communications may be filtered through a firewall 211.

Persons skilled in the art will appreciate that in accordance with known techniques, functionality at the server side of network 201 may be distributed over a plurality of different computers. For example, elements may be run as a single "engine" on one server or a separate server may be provided. For example, game server 205 may implement a random number generator engine. Alternatively, a separate random number generator server may be provided. Further, persons skilled in the art will appreciate that a plurality of game servers may be provided to implement different games or a single game server may implement a plurality of different games as required by the terminals.

In an exemplary embodiment, a player may place a wager using the game play mechanism 56. A game (or game session) may be initiated in response to placement of the wager, a plurality of symbols randomly drawn, and a game (or game session) outcome determined based upon the symbols drawn. A game outcome may be compared to a pay table (which may be stored in a computer memory) to determine a payout or award (also referred to herein as a win entitlement). Persons skilled in the art will appreciate that a player's wager can be varied from game to game dependent on player selections.

In various embodiments, a wager may include a selection of a number of lines to be played during a game session. Such lines may include an interconnected combination of symbol display positions. Each selected line may be evaluated to identify winning combinations of symbols. A pay table (e.g., a pay table stored in memory 64) may be referenced to identify a payout or award based upon an identified winning combination of symbols. In various embodiments, an award may be multiplied or increased by a multiplication factor as well.

In an exemplary embodiment, gaming machine 202 may generate an award that is not based solely upon a number of a lines selected. For example, "scatter" pays (e.g., randomly selected awards that are not identified based upon a plurality of adjacent symbols) may be awarded independently of a player's selection of pay lines.

With reference now to FIGS. 6-10, an electroluminescent display 600 is described. The electroluminescent display 600 may be coupled to and/or used with the electronic gaming machines and systems described above. For example, electroluminescent display 600 may be applied to one or more "blank" or non-display areas or surfaces of gaming machine 10, such as the side or back panels of gaming machine cabinets, exposed surfaces of solid panel displays, gaming machine seating areas, including gaming machine seat cushions and seatbacks, gaming machine footrests, one or more chair sleds associated with the gaming machine, one or more wedges which may be placed between one or more gaming machines, one or more gaming machine cabinet spacing elements, and the like.

Figure 6:
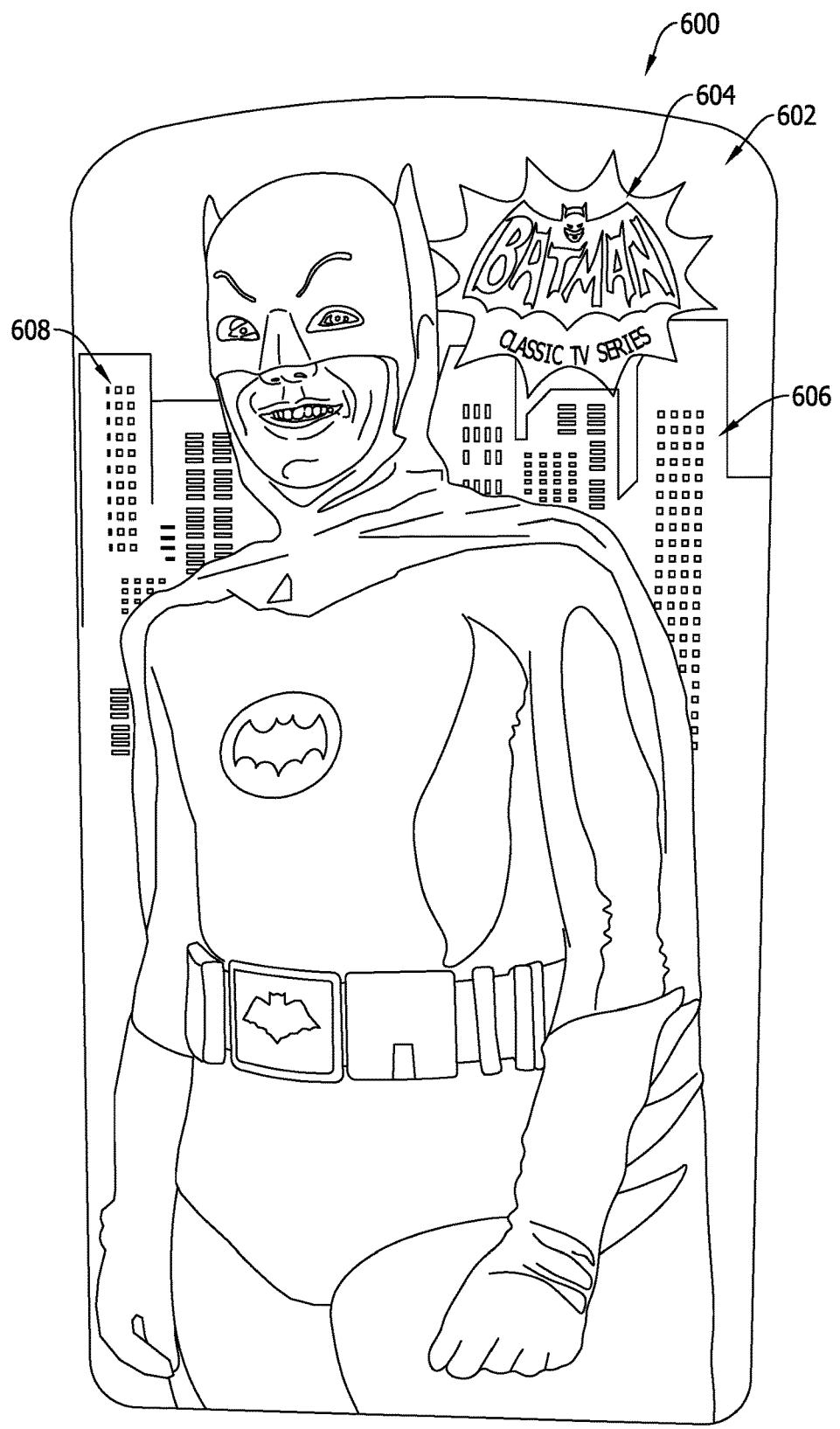
FIG. 6 is a front view of an exemplary electroluminescent display.
Figure 7:
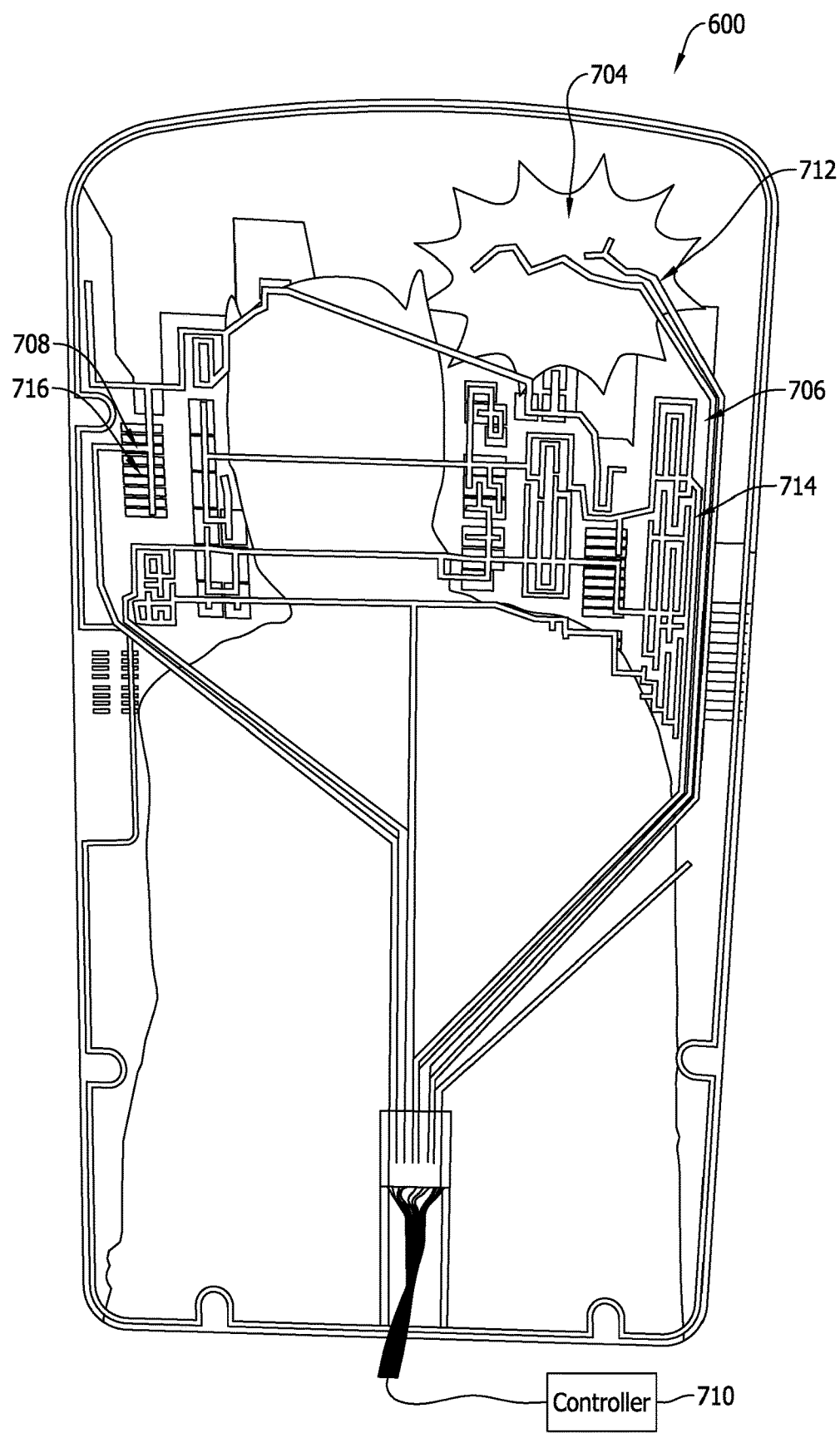
FIG. 7 is a back view of the exemplary electroluminescent display shown at FIG. 6, in which a backing is removed from the electroluminescent display.
Figure 8:
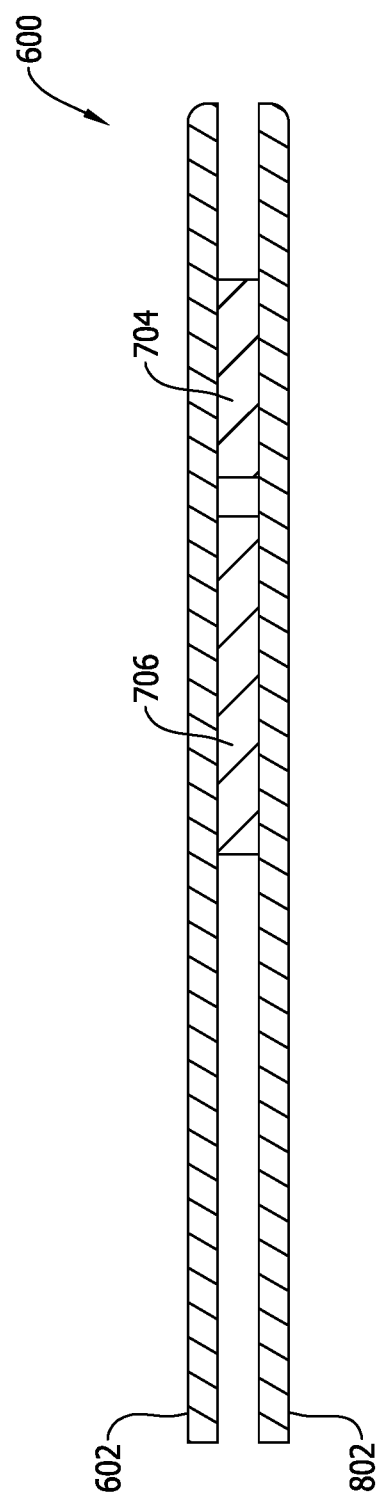
FIG. 8 is a cross-sectional view of the exemplary electroluminescent display shown at FIG. 6.

FIG. 6 is a front view of electroluminescent display 600. FIG. 7 is a back view of electroluminescent display 600. FIG. 8 is a cross-sectional view of electroluminescent display 600. In the exemplary embodiment, electroluminescent display 600 is comprised of a flexible material, such as a flexible laminated material, configured to be applied to any blank surface of an electronic gaming system, such as those described above.

Accordingly, with combined reference to FIGS. 6, 7, and 8 electroluminescent display 600 includes a backing 802, a graphics layer 602, and a plurality of electroluminescent (EL) display elements, such as a first EL display element 704, a second EL display element 706, and/or a third EL display element 708. In the exemplary embodiment, backing 802 is an "appliable" backing, such as any backing capable of being applied and/or removably applied to a surface of an electronic gaming system. For example, in some embodiments, backing 802 is a flexible magnetic backing and/or an adhesive backing and is configured to be removably applied to a surface, such as a non-display or blank surface, of an electronic gaming system. To this end, backing 802 may be shaped (e.g., cut, manufactured, or otherwise shaped or formed) to correspond to a blank surface of an electronic gaming system. In other words, backing 802 may be shaped to cover a blank surface of an electronic gaming system.

Graphics layer 602 is a sheet or layer of flexible material, such as biaxially-oriented polyethylene terephthalate (Bo-PET or MYLAR). Graphics layer 602 may include artwork, such as any artwork associated with an electronic gaming system and/or a game theme implemented on an electronic gaming system. As such, graphics layer 602 may include one or more graphics regions, or regions to be illuminated, such as a first graphics region 604, a second graphics region 606, and/or a third graphics region 608. Graphics regions 604-608 may include any desirable shape and/or color and may be configured to be back illuminated by one or more EL display elements (as described herein).

In various embodiments, EL display elements 704-708 are any suitable electroluminescent element, such as, for example, any electroluminescent display panel. In general terms, EL display elements 704-708 may include an electroluminescent layer (such as a phosphor layer) sandwiched or coupled between front and rear electrodes (not shown) and/or one or more layers of insulating material (not shown). In some embodiments, EL display elements 704-708 may include multiple layers of different colored phosphors, such as, for example, to achieve different lighting effects. However, in other embodiments, EL display elements 704-708 may include one or more layers of a single color of phosphor, such as, for example, where graphics layer 602 is supplied with color graphics and overlaid on EL display elements 704-708. In addition, in some embodiments, one or more EL controller may be used to configure the brightness setting of one or more EL display elements. For example, a voltage supplied by the EL controller 710 to EL display elements 704-708 may be increased and/or decreased to adjust a brightness of an EL display element 704-708.

In the exemplary embodiment, EL display elements 704-708 can be cut or shaped to correspond to a shape of a graphics region, such as a graphics region 604-608. For example, a shape of first EL display element 704 may correspond to or match a shape of first graphics region 604. Similarly, a shape of second EL display element 706 may correspond to or match a shape of second graphics region 606, and a shape of third EL display element 708 may correspond to or match a shape of third graphics region 608. Although three EL display elements 704-708 and three graphics regions 604-608 are described herein, it will be understood that any suitable number of EL display elements and/or any suitable number of graphics regions may be implemented with electroluminescent display 600. Further, in the exemplary embodiment, each shaped EL display element 704-708 may be disposed behind or under an associated graphics region 604-608, such that, during operation, each EL display element 704-708 back-illuminates an associated graphics region 604-608.

Each EL display element 704-708 may be coupled to and controlled and/or powered by an EL controller 710, such as any conventional electroluminescent display controller. As described herein, in some embodiments, each EL display element 704-708 may also be coupled to a gaming machine controller, such as, for example, controller 60, which may also control and/or power one or more EL display elements 704-708. In addition, EL display elements 704-708 may be coupled to a power source (not shown), such as a power source configured to provide a bias voltage to each EL display element 704-708. Moreover, in some embodiments, a power inverter (not shown) may be coupled to one or more EL display elements 704-708, such as, for example, to provide alternating current to the one or more EL display elements 704-708.

To couple EL display elements 704-708 to EL controller 710 (and/or game controller 60), one or more electrically conducting elements (e.g., conductive "traces") may be coupled between one or more EL display elements 704-708 and EL controller 710. For example, as shown at FIG. 7, a first trace (or group of traces) 712 may be coupled between EL controller 710 and first EL display element 704. Similarly, a second trace (or group of traces) 714 may be coupled between EL controller 710 and second EL display element 706, and a third trace (or group of traces) 716 may be coupled between EL controller 710 and third EL display element 708. Traces 712-716 may be etched into, soldered on, or otherwise bonded or laminated on an interior surface of backing 802. In other embodiments, traces 712-716 are simply electrically conducting wires and/or any other suitable electrically conducting element.

During manufacturing, graphics layer 602, EL display elements 704-708, and backing 802 may be laminated or otherwise bonded to form a flexible material. The flexible material may be cut or formed to match a shape of an area or surface (e.g., a blank surface) of an electronic gaming system, such that the flexible material is sized and shaped to fit over or cover the blank surface.

Figure 9:
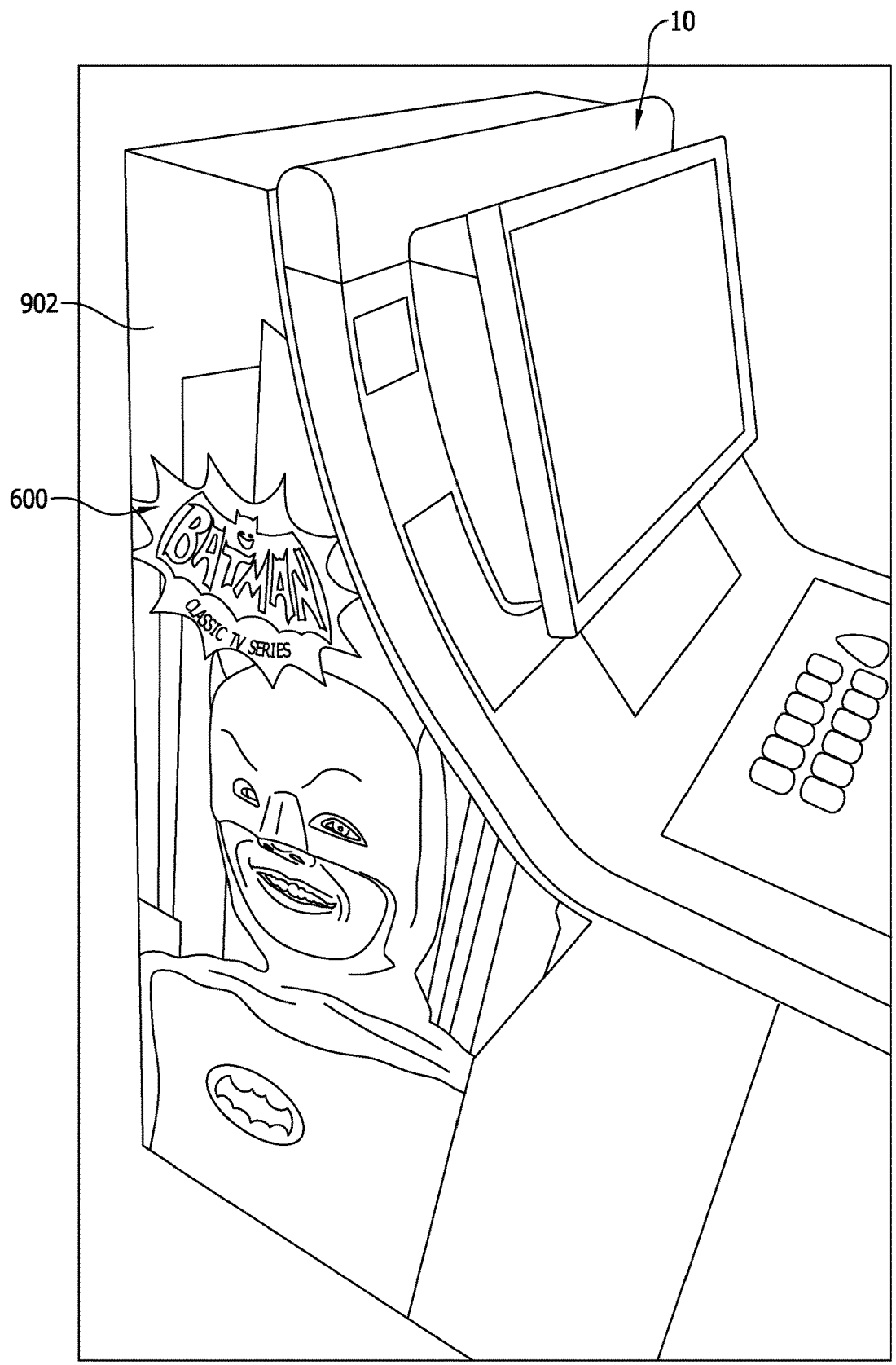
FIG. 9 is a perspective view of the gaming machine shown at FIG. 1, to which the electroluminescent display shown at FIG. 6 has been applied.

FIG. 9 shows a perspective view of a gaming machine, such as gaming machine 10, to which an electroluminescent display, such as electroluminescent display 600, may be applied. As described herein, electroluminescent display 600 may be applied (e.g., removably applied or fixedly/permanently applied) to any blank surface of an electronic gaming system, such as gaming machine 10. For example, as shown at FIG. 9, electroluminescent display 600 may be applied over a portion 902 of a gaming machine cabinet of gaming machine 10. Electroluminescent display 600 may be cut or shaped to correspond to a shape of portion 902, such that electroluminescent display 600 is removably appliable or removably coupleable to portion 902.

To apply electroluminescent display 600 to portion 902 of gaming machine 10, backing 802 may be magnetic, in which case electroluminescent display 600 may simply magnetically couple to portion 902 (which may be made of a metal or metal alloy). Similarly, in some embodiments, backing 802 may include an adhesive, in which case electroluminescent display 600 may be adhesively bonded to portion 902. In other embodiments, electroluminescent display 600 may include a coupleable perimeter, such as stitchable perimeter, which may be reinforced with a layer or strip of durable or tear-resistant material and which may be configured to receive a stitching element, such as a thread or fiber. In such a case, electroluminescent display 600 may, for example, be stitched on or upholstered over a component of an electronic gaming system, such as over a seat cushion. In other embodiments, and more generally, electroluminescent display 600 may be applied or coupled to any suitable portion of an electronic gaming system, such as a seatback (e.g., using any suitable magnetic or adhesive backing), and/or any other non-display and/or blank surface of an electronic gaming system, such as a non-display surface of a solid panel display, one or more gaming machine footrests, one or more chair sleds associated with a gaming machine, one or more wedges, one or more cabinet spacing elements, and the like.

In some embodiments, a protective frame (not shown) may be included with electroluminescent display 600. The protective frame may be coupled to a seatback (and/or any other blank surface) and may enclose and/or support electroluminescent display 600. Further, in some embodiments, a protective covering (not shown), such as a transparent protective covering, may be included with electroluminescent display 600. The protective covering may be configured to fit over and/or attached to any suitable blank surface, such as, for example, any footrest, any chair sled, any seatback, any cabinet surface, and/or any other surface over which electroluminescent display 600 may be applied.

Figure 10:
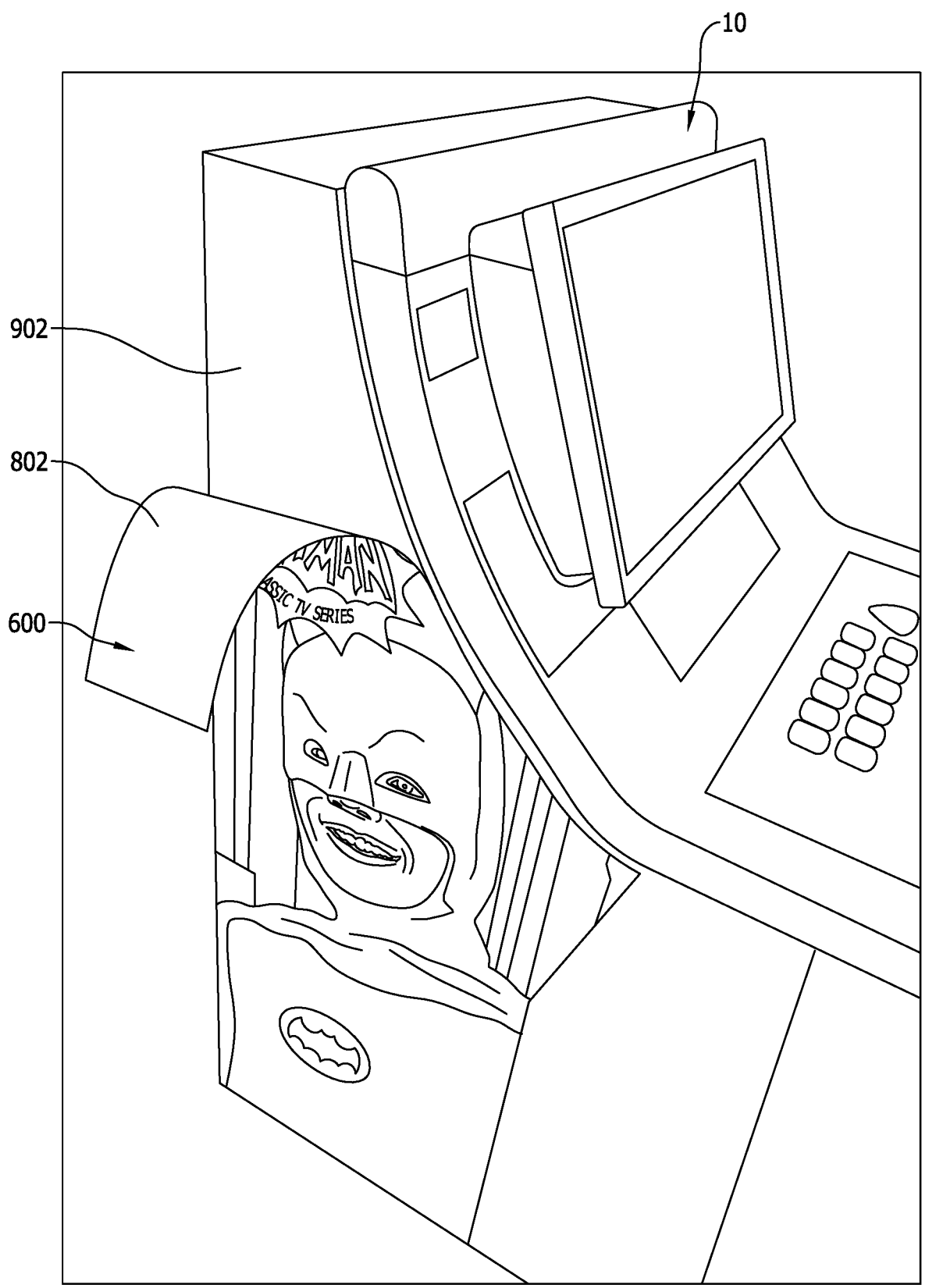
FIG. 10 is a perspective view of the gaming machine shown at FIG. 1, to which the electroluminescent display shown at FIG. 6 has been applied and from which the electroluminescent display is being removed.

FIG. 10 shows a perspective view of a gaming machine, such as gaming machine 10, to which a removable electroluminescent display, such as electroluminescent display 600, has been applied and from which electroluminescent display 600 may be decoupled or removed. As shown, in at least some embodiments, electroluminescent display 600 is flexible and may be easily removed from portion 902 of gaming machine 10. For example, where backing 802 is magnetic, electroluminescent display 600 may simply be peeled away from portion 902 (and/or any other portion of an electronic gaming system to which electroluminescent display 600 is applied or coupled), such as during installation, when gaming machine 10 is reconfigured with a different game, when electroluminescent display 600 is replaced by a new or different electroluminescent display, and the like. Once removed, electroluminescent display 600 may be carried (e.g., by a technician) to another gaming machine and coupled to a blank surface thereof. Thus, in the exemplary embodiment, electroluminescent display 600 is easily swappable between gaming machines.

Figure 11:
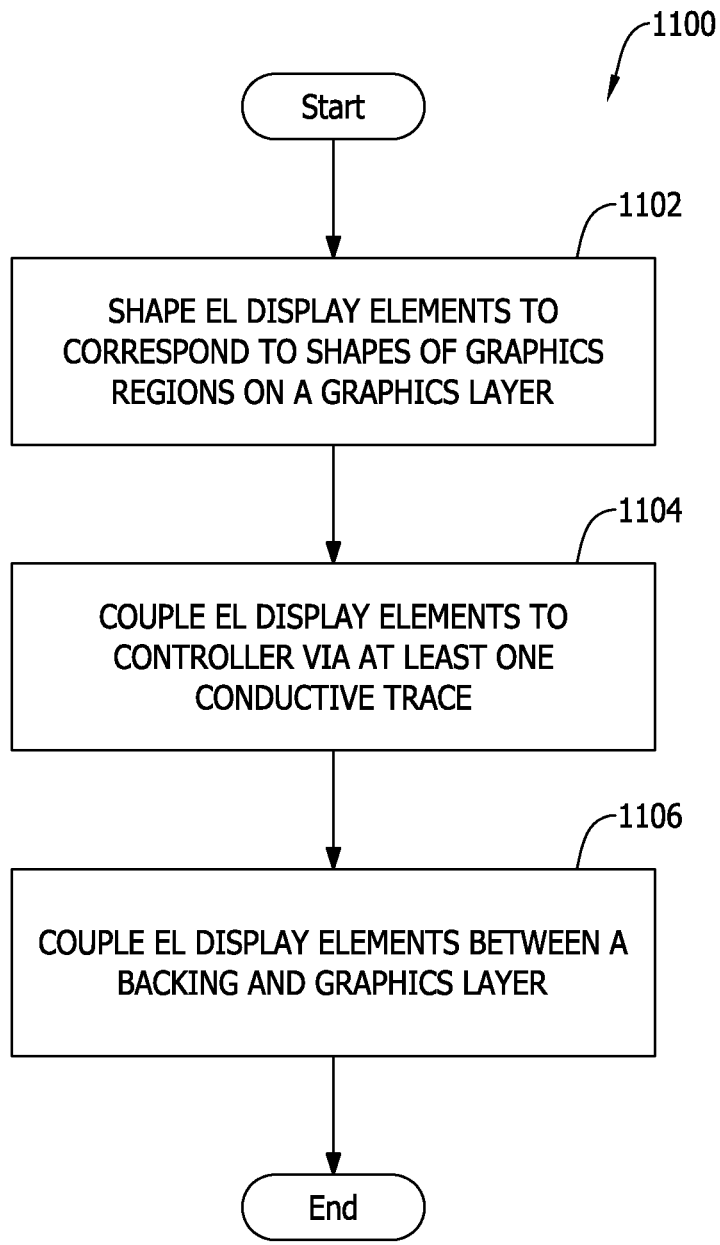
FIG. 11 is a flowchart of an exemplary process for manufacturing the electroluminescent display shown at FIG. 6.

FIG. 11 shows a flowchart of an exemplary process 1100 for manufacturing electroluminescent display 600. Accordingly, and as described briefly above, in various embodiments, a plurality of EL display elements, such as EL display elements 704-708, may be shaped to correspond to the shapes of a plurality of graphics regions, such as graphics regions 604-608 (step 1102). EL display elements 704-708 may, in addition, be electrically coupled to at least one electrically conductive element, such as a trace (described above), which may be coupled at another end to EL controller 710 (step 1104). Further, in the exemplary embodiment, each EL display element 704-708, and/or each of the traces connecting EL display elements 704-708 to EL controller 710, may be laminated or otherwise bonded or coupled between graphics layer 602 and backing 802 (step 1106). Thus, after manufacturing, electroluminescent display 600 is configured as a flexible material capable of being removably applied to a surface (e.g., a blank surface) of an electronic gaming system.

In some embodiments, electroluminescent display 600 may be configured to generate an effect, such as an animated effect and/or a static effect, in response to activity by a player within an area of gaming machine 10 and/or in response to a proximity of the player to gaming machine 10. To achieve this result, gaming machine 10 may include one or more proximity sensors, such as one or more optical sensors (e.g. camera, not shown), one or more infrared sensors (not shown), one or more acoustic sensors (not shown) and the like, each of which may be coupled to game controller 60 and/or EL controller 710. When a player comes within range (e.g., within a predefined physical area) of gaming machine 10, one or more proximity sensors may detect the presence of the player, and game controller 60 and/or EL controller 710 may, in response, cause electroluminescent display 600 to generate a desired effect.

Further, in some embodiments, a plurality of electroluminescent displays 600 may be networked between a plurality of gaming machines 10, such as, for example, to achieve an animated and/or static effect over the plurality of gaming machines 10. For example, one or more networked (and/or standalone) game controllers 60 may control any suitable number of electroluminescent displays 600. Similarly, one or more networked (and/or standalone) EL controllers 710 may control any suitable number of electroluminescent displays 600. Irrespective of the control mechanism employed, however, a plurality of electroluminescent displays 600 may be controlled together to generate an animated or static effect over one or more blank surface of a plurality of gaming machines 10, such that, for example, the animated and/or static effect is distributed over and/or spans the blank surfaces of the plurality of gaming machines 10.

Embodiments of the electroluminescent display, as described above, facilitate application of the electroluminescent display, which may be configured as a flexible material, to a non-display (or "blank") surface of an electronic gaming system. For example, in various embodiments, the electroluminescent display includes a magnetic and/or an adhesive backing and is configured to be removably applied to a blank surface of a gaming machine, a blank surface of a seating area (such as a seatback and/or a seat cushion), and the like. The electroluminescent display further includes a graphics layer having one or more graphics regions, each associated with a shape. Each of a plurality of electroluminescent display elements may be shaped (e.g., cut or otherwise manufactured) to correspond to a shape of a particular graphics region and coupled between the backing and a graphics layer to back-illuminate a particular graphics region during operation. Thus, the electroluminescent display described herein is flexible and may be removably applied to an unused blank surface of an electronic gaming system to repurpose the surface, under operating conditions, as a display unto itself.

As indicated above, the process may be embodied in computer software. The computer software could be supplied in a number of ways, for example on a tangible computer readable storage medium, such as a disc or a memory device, e.g. an EEPROM, (for example, that could replace part of memory 103) or as a data signal (for example, by transmitting it from a server). Further different parts of the computer software can be executed by different devices, for example in a client server relationship. Persons skilled in the art, will appreciate that computer software provides a series of instructions executable by the processor.

Exemplary embodiments of an electroluminescent display and related components are described above in detail. The disclosure is not limited to the specific embodiments described herein, but rather, components of the systems and/or articles and/or steps of the methods may be utilized independently and separately from other components and/or steps described herein. For example, the configuration of components described herein may also be used in combination with other processes, and is not limited to practice with the systems, articles, and related methods as described herein. Rather, the exemplary embodiment can be implemented and utilized in connection with many applications in which a game or bonus game is desired.

Although specific features of various embodiments of the present disclosure may be shown in some drawings and not in others, this is for convenience only. In accordance with the principles of the present disclosure, any feature of a drawing may be referenced and/or claimed in combination with any feature of any other drawing.

This written description uses examples to disclose the embodiments of the present disclosure, including the best mode, and also to enable any person skilled in the art to practice the disclosure, including making and using any devices or systems and performing any incorporated methods. The patentable scope of the embodiments described herein is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An electroluminescent display comprising:
    a flexible display material shaped to cover a designated portion of an electronic gaming machine, the flexible display material including:
        an appliable backing layer including an interior surface, an exterior surface, and a body extending continuously between the interior surface and the exterior surface, the exterior surface configured to be removably affixed to the designated portion of the electronic gaming machine;
        a plurality of electrically conductive traces fixably mounted on, and in direct contact with, the interior surface of the appliable backing layer;
        a graphics layer including a plurality of graphics regions, each graphics region of the plurality of graphics regions having an associated shape; and
        a plurality of electroluminescent (EL) display elements disposed between the interior surface of the appliable backing layer and the graphics layer, each EL display element of the plurality of EL display elements shaped to correspond to and match a shape of one of the plurality of graphics regions, each EL display element of the plurality of EL display elements configured to back-illuminate a respective matching graphics region of the plurality of graphics regions, wherein each electrically conductive trace of the plurality of electrically conductive traces is electrically coupled to at least one EL display element of the plurality of EL display elements and configured to supply electrical power thereto,
        wherein the plurality of electrically conductive traces are each positioned on the interior surface of the appliable backing layer to correspond with a position of at least one EL display element relative to the graphics layer to facilitate electrically coupling each EL display element to at least one electrically conductive trace when the graphics layer and the plurality of EL display elements are coupled to the appliable backing layer; and
    a controller coupled, through the plurality of electrically conductive traces, to the plurality of EL display elements, wherein the controller is a networked controller configured to synchronously control the EL display and an additional EL display disposed on an additional electronic gaming machine to distribute at least one of an animated and static effect over the EL display and the additional EL display.

2. The electroluminescent display of claim 1, wherein the controller is configured to receive, from a sensing device, data indicating that a player is in proximity to the electroluminescent display, and in response to receiving the data, the controller is further configured to control at least one of the plurality of EL display elements to be illuminated in response to the player being in proximity to the electroluminescent display.

3. The electroluminescent display of claim 1, wherein the appliable backing layer is at least one of a flexible magnetic backing and an adhesive backing.

4. The electroluminescent display of claim 1, wherein the plurality of electrically conductive traces are at least one of etched into and soldered on the interior surface of the appliable backing layer, wherein the exterior surface is sized to match at least one non-electronic display surface of the electronic gaming machine to facilitate covering the at least one non-electronic display surface when the exterior surface is removably coupled to the at least one non-electronic display surface of the electronic gaming machine.

5. The electroluminescent display of claim 1, the flexible display material further including a stitchable perimeter, the stitchable perimeter configured to receive a stitching material.

6. The electroluminescent display of claim 1, wherein the flexible display material is configured to be upholstered on a seating element of the electronic gaming machine.

7. The electroluminescent display of claim 1, wherein the graphics layer is printed with artwork and comprises a sheet of biaxially-oriented polyethylene terephthalate (BoPET).

8. An electroluminescent display comprising:
- an appliable backing layer including an interior surface, an exterior surface, and a body extending continuously between the interior surface and the exterior surface, the exterior surface configured to be removably affixed to a portion of an electronic gaming machine;
- a plurality of electrically conductive traces fixably mounted on, and in direct contact with, the interior surface of the appliable backing layer;
- a graphics layer including a plurality of shaped graphics regions; and
- a plurality of electroluminescent (EL) display elements disposed between the interior surface of the appliable backing layer and the graphics layer, each of the plurality of EL display elements defining a shaped electroluminescent region, each shaped electroluminescent region corresponding to and matching a shape of a shaped graphics region of the graphics layer and configured to back-illuminate the corresponding graphics region of the graphics layer, wherein each electrically conductive trace of the plurality of electrically conductive traces is electrically coupled to at least one EL display element of the plurality of EL display elements and configured to supply electrical power thereto; and
- a controller coupled, through the plurality of electrically conductive traces, to the plurality of EL display elements, wherein the controller is a networked controller configured to synchronously control the EL display and an additional EL display disposed on an additional electronic gaming machine to distribute at least one of an animated and static effect over the EL display and the additional EL display,
- wherein the plurality of electrically conductive traces are configured to supply electrical power to the plurality of EL display elements in response to a control signal generated by the controller, wherein the plurality of electrically conductive traces are each positioned on the interior surface of the appliable backing layer to correspond with a position of at least one EL display element relative to the graphics layer to facilitate electrically coupling each EL display element to at least one electrically conductive trace when the graphics layer and the plurality of EL display elements are coupled to the appliable backing layer.

9. The electroluminescent display of claim 8, wherein the appliable backing layer is a flexible magnetic backing and is sized to match at least one non-electronic display surface of the electronic gaming machine to facilitate covering the at least one non-electronic display surface when the exterior surface is removably applied to the electronic gaming machine.

10. The electroluminescent display of claim 8, wherein the plurality of electrically conductive traces are at least one of etched into and soldered on the interior surface of the appliable backing layer, wherein the exterior surface is configured to be removably applied to a surface of the electronic gaming machine that does not otherwise include a display.

11. The electroluminescent display of claim 8, wherein the graphics layer is printed with artwork and comprises a sheet of biaxially-oriented polyethylene terephthalate (Bo-PET).

12. The electroluminescent display of claim 8, wherein the controller is configured to receive, from a sensing device, data indicating that a player is in proximity to the electroluminescent display, and in response to receiving the data, the controller is further configured to control at least one of the plurality of EL display elements to be illuminated in response to the player being in proximity to the electroluminescent display.

13. An electronic gaming system comprising:
- an electronic gaming machine comprising:
  - a display configured to display a wagering game;
  - a player input interface configured to receive a player input;
  - a credit input mechanism including at least one of a card reader, a ticket reader, a bill acceptor, and a coin input mechanism, the credit input mechanism configured to receive a credit wager, the credit wager initiating play of the wagering game; and
  - a game controller for controlling the wagering game; and
- a flexible electroluminescent (EL) display configured to be applied to a designated portion of the electronic gaming machine, the flexible EL display including:
  - an appliable backing layer including an interior surface, an exterior surface, and a body extending continuously between the interior surface and the exterior surface, the exterior surface configured to be removably affixed to the designated portion of the electronic gaming machine;
  - a plurality of electrically conductive traces fixably mounted on, and in direct contact with, the interior surface of the appliable backing layer;
  - a graphics layer including a plurality of graphics regions, each graphics region of the plurality of graphics regions having an associated shape; and
  - a plurality of EL display elements disposed between the interior surface of the appliable backing layer and the graphics layer, each EL display element of the plurality of EL display elements shaped to correspond to and match a shape of one of the plurality of graphics regions, each EL display element of the plurality of EL display elements configured to back-illuminate a respective matching graphics region of the plurality of graphics regions, wherein each electrically conductive trace of the plurality of electrically conductive traces is electrically coupled to at least one EL display element of the plurality of EL display elements and configured to supply electrical power thereto,
  - wherein the plurality of electrically conductive traces are each positioned on the interior surface of the appliable backing layer to correspond with a position of at least one EL display element relative to the graphics layer to facilitate electrically coupling each EL display element to at least one electrically conductive trace when the graphics layer and the plurality of EL display elements are coupled to the appliable backing layer, and
  - wherein the game controller is a networked game controller configured to synchronously control the flexible EL display and an additional flexible EL display disposed on an additional electronic gaming machine to generate an animated effect over the flexible EL display and the additional flexible EL display to distribute the animated effect over the electronic gaming machine and the additional gaming machine.

14. The electronic gaming system of claim 13, wherein the appliable backing layer is a flexible magnetic backing and is configured to be removably applied to an exterior surface of the electronic gaming machine.

15. The electronic gaming system of claim 13, wherein the plurality of electrically conductive traces are at least one of etched into and soldered on the interior surface of the appliable backing layer, wherein the exterior surface is sized to match at least one non-electronic display surface of the electronic gaming machine to facilitate covering the at least one non-electronic display surface when the exterior surface is removably applied to the electronic gaming machine.

16. The electronic gaming system of claim 13, wherein the appliable backing layer is shaped to be removably applied to a surface of at least one of: an electronic gaming machine cabinet and a seating element of the electronic gaming machine.

17. The electronic gaming system of claim 13, wherein the flexible electroluminescent display further includes a controller, and wherein each electrically conductive trace of the plurality of electrically conductive traces is coupled between the controller and at least one EL display element of the plurality of EL display elements, and wherein the plurality of electrically conductive traces are configured to supply electrical power to each EL display element in response to a control signal generated by the controller.

18. The electronic gaming system of claim 13, wherein each electrically conductive trace of the plurality of electrically conductive traces is coupled between the game controller and at least one EL display element of the plurality of EL display elements, and wherein the plurality of electrically conductive traces are configured to supply electrical power to each EL display element in response to a control signal generated by the game controller.

* * * * *